(12) United States Patent
Jerich

(10) Patent No.: US 8,100,614 B2
(45) Date of Patent: Jan. 24, 2012

(54) DUAL USE TRANSPORT VEHICLE

(75) Inventor: Herbert Jerich, Gleisdorf (AT)

(73) Assignee: Jerich Austria GmbH, Gleisdorf (AT)

( * ) Notice: Subject to any disclaimer, the term of this patent is extended or adjusted under 35 U.S.C. 154(b) by 153 days.

(21) Appl. No.: 12/369,896

(22) Filed: Feb. 12, 2009

(65) Prior Publication Data

US 2010/0202849 A1 Aug. 12, 2010

(51) Int. Cl.
*B61D 3/16* (2006.01)
(52) U.S. Cl. ............................................................. 410/2
(58) Field of Classification Search .............. 410/2, 156; 141/10
See application file for complete search history.

(56) References Cited

U.S. PATENT DOCUMENTS

| | | | | |
|---|---|---|---|---|
| 1,071,240 A * | 8/1913 | Kirkpatrick | ..................... | 220/9.3 |
| 1,263,294 A * | 4/1918 | Taylor | ............................ | 220/9.3 |
| 2,696,235 A * | 12/1954 | Toffolon | ......................... | 383/18 |
| 3,097,677 A * | 7/1963 | Mitchell | ......................... | 383/72 |
| 3,222,099 A * | 12/1965 | Swallert | ......................... | 296/10 |
| 3,400,741 A * | 9/1968 | Gursky et al. | ................... | 383/66 |
| 3,638,699 A * | 2/1972 | Hillinger | ...................... | 220/647 |
| 3,978,901 A * | 9/1976 | Jones | ......................... | 206/524.5 |
| 4,092,051 A * | 5/1978 | D'Orazio | ........................ | 298/24 |
| 4,497,259 A * | 2/1985 | Titterton | ....................... | 105/359 |
| 4,573,508 A * | 3/1986 | Knaus | ........................... | 220/562 |
| 4,643,475 A * | 2/1987 | Neumann | ....................... | 296/10 |
| 4,722,655 A * | 2/1988 | Bonerb | ......................... | 414/288 |
| 5,114,045 A * | 5/1992 | Herpe | ............................ | 222/105 |
| 5,499,743 A * | 3/1996 | Blumenkron | ................. | 222/107 |
| 5,542,765 A * | 8/1996 | Smith et al. | ..................... | 383/17 |
| 6,626,312 B2 * | 9/2003 | Maturana | ....................... | 220/1.6 |
| 6,842,955 B2 * | 1/2005 | Joshi et al. | ................ | 29/407.01 |
| 6,913,028 B2 * | 7/2005 | Morioka et al. | ................ | 134/61 |
| 7,503,885 B2 * | 3/2009 | Reicin et al. | .................. | 493/295 |
| 7,717,296 B1 * | 5/2010 | Guthrie | ......................... | 222/105 |
| 2010/0032053 A1* | 2/2010 | Chong et al. | ..................... | 141/10 |
| 2010/0260588 A1* | 10/2010 | Martin et al. | ................. | 414/495 |

FOREIGN PATENT DOCUMENTS

| | | |
|---|---|---|
| DE | 20 2006 002 564 | 4/2006 |
| EP | 0 763 459 | 3/1997 |
| FR | 900012 | 6/1945 |
| WO | 00/03893 | 1/2000 |

* cited by examiner

*Primary Examiner* — H Gutman
(74) *Attorney, Agent, or Firm* — Young & Thompson

(57) ABSTRACT

A transport vehicle includes a chassis (4) with wheels (5), a load compartment (3) on the chassis with a load floor (7), longitudinal side walls (6) extending upwardly with respect to the load floor, a bulkhead (9) at the front, at least one load door (10) at the back, and a roof (8). A mezzanine floor (12) is provided in the load compartment above the load floor, lifting elements (18-25) which cooperate with the mezzanine floor for adjusting the height thereof with respect to the load floor, and a closed flexible bag (13) for containing a fluid, the bag having a lower surface (14) and an upper surface (15), the lower surface being supported in the load compartment and the upper surface being freely supported above the lower surface in dependence on the contents of the bag. The flexible bag (13) is positioned on top of the mezzanine floor (12).

17 Claims, 7 Drawing Sheets

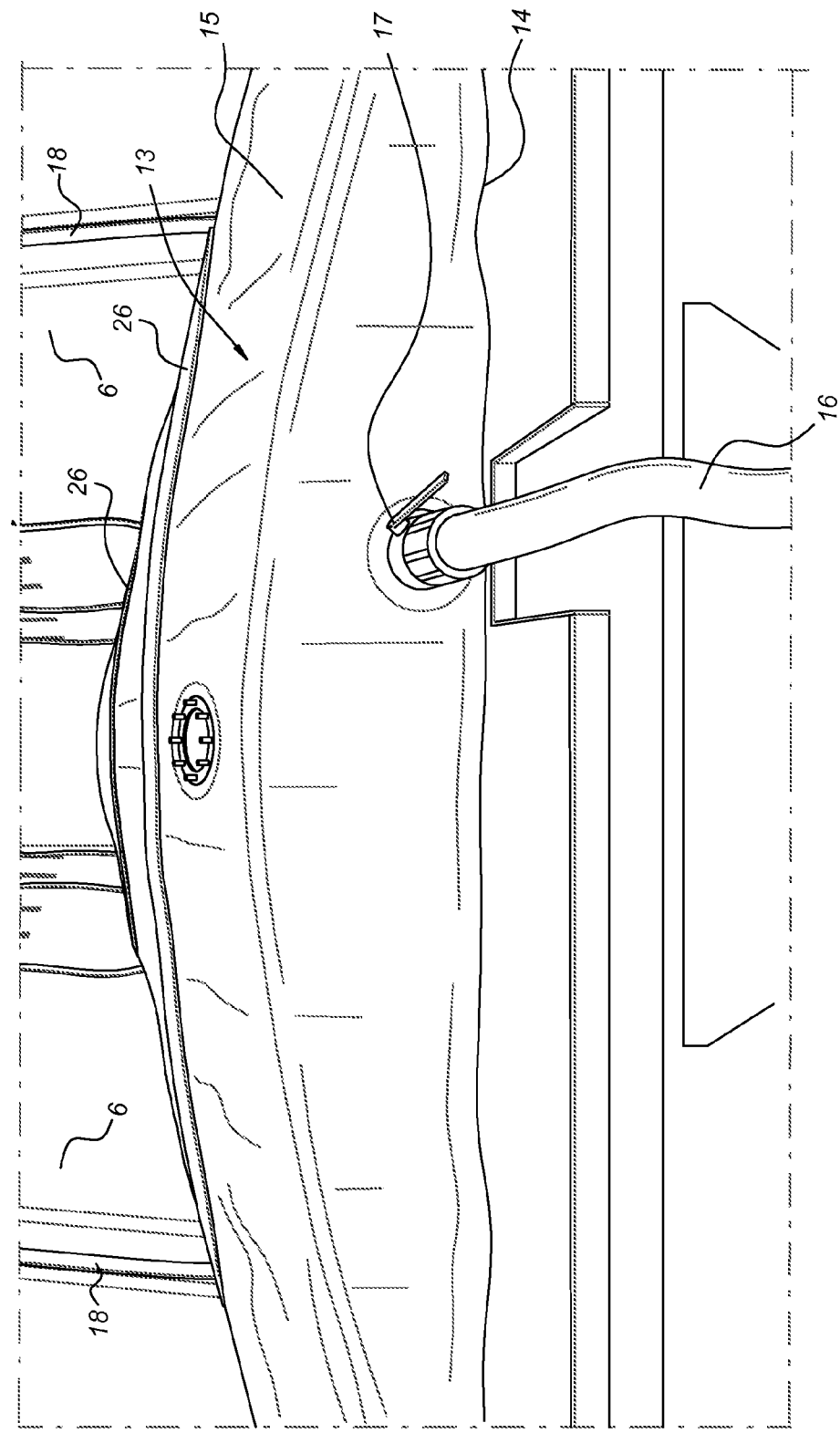

DUAL USE TRANSPORT VEHICLE

BACKGROUND OF THE INVENTION

The invention is related to a transport vehicle, comprising a chassis provided with wheels, a load compartment on said chassis and provided with a load floor, longitudinal side walls which extend upwardly with respect to the load floor, a bulkhead at the front, at least one load door at the back, as well as a roof, wherein a mezzanine floor is provided in the load compartment above the load floor, lifting means which cooperate with the mezzanine floor for adjusting the height of said mezzanine floor with respect to the load floor, as well as a closed flexible bag for containing a fluid, said bag having a lower surface and an upper surface, said lower surface of the bag being supported in the load compartment and said upper surface of the bag being freely supported above said lower surface in dependence on the contents of the bag.

DESCRIPTION OF THE RELATED ART

Such transport vehicles are known. As a result of their ability to be converted into either a vehicle which is fit for transporting a liquid, or into a vehicle which is fit for transporting other goods, in particular packed goods, parcels and the like, they provide a high degree of operational efficiency. Traditionally, tank vehicles were only capable of transporting bulk goods, in particular liquid bulk goods, which often meant that no return loads other than (the same) liquid could be handled. This severely limited the usefulness of said traditional tank vehicles.

According to the state of the art as disclosed in EP-A-763.459, an improvement has been obtained by providing a flexible bag on the load floor of the vehicle. Above said bag, a mezzanine floor is provided which is displaceable between a high position an a low position. Before filling the bag with a liquid, the mezzanine floor is lifted into the high position. Possibly, some goods are placed on said mezzanine floor. As the bag is at a low position on the load floor of the load compartment, the centre of gravity of the liquid load is at such low position as well which is advantageous for the stability of the loaded vehicle. In case no liquid is to be transported, the mezzanine floor is lowered while the bag is in a collapsed state. A larger amount of goods can then be stored in the load compartment.

The disadvantage of such arrangement is that, even in the lowered state, the mezzanine floor is still at a considerable distance above the load floor of the compartment, having regard to the fact that the collapsed bag still takes some space. Consequently, it is difficult to load or unload the mezzanine floor, because loading devices such as a fork lift are obliged to operate at a fairly high level. Moreover, although the bag is covered by the mezzanine floor, it is still in a somewhat vulnerable position. The bag may easily become damaged by objects which fall off the mezzanine floor.

According to another proposal as disclosed in DE-U-20.2006.002.564, a mezzanine floor is provided in the load compartment of a transport vehicle, together with a rigid, metal tank on top of the mezzanine floor. In the lowered position of the mezzanine floor, the tank will be able to receive a liquid. The centre of gravity of the load is thus at a relatively low position. In case other goods than liquids are to be transported, the mezzanine floor together with tank is lifted. The load floor thus becomes available for receiving these goods. The disadvantage of this arrangement is that the volume which becomes available after lifting the mezzanine floor, remains limited. The tank still takes a considerable space above the lifted mezzanine floor, which goes at the expense of the space below the mezzanine floor. Thus, problems arise when moving the goods over the load floor, and moreover the stacking height is small.

SUMMARY OF THE INVENTION

The object of the invention is to provide a transport vehicle of the type described before for dual uses, which lacks the disadvantages described before and which provides a largely unobstructed load compartment in the raised position of the mezzanine floor for accommodating packed goods. Said object is achieved in that the lower surface of the flexible bag is positioned on top of the mezzanine floor.

The position of the flexible bag on top of the mezzanine floor provides a combination of advantages which increases the operational efficiency of the transport vehicle in question considerably. The availability of the flexible bag within the load compartment makes it possible to convert the transport vehicle into a liquid tanker. The mezzanine floor is lowered on top of the load floor, after which the flexible bag can be filled with liquid. As the flexible bag may be of a size which is similar to the size of the mezzanine floor or the load floor, a large amount of liquid can be accommodated. As an example, the flexible bag may have a capacity of 24.000 liters of liquid, which amounts to a payload of about 24 tons. Flexible bags having other capacities may however be used as well. Also, several bags may be placed next to each other on top of the mezzanine floor. In that case, preferably such bags adjoin each other so as to fully occupy the space available on the mezzanine floor. Always, the centre of gravity of the liquid load is at the lowest possible level, which greatly contributes to the stability of the transport vehicle.

Conversely, the transport vehicle is quite well fit for parcels or packed goods as well. The mezzanine floor with the emptied flexible bag is then lifted to a high position directly beneath the roof of the load compartment. As the flexible bag is in the collapsed state, the combined height of the floor and bag is fairly low which means that height of the load compartment, measured from the load floor to the underside of the lifted mezzanine floor, is only a fraction smaller than the total height of the load compartment. Thus, the useful transport space within the load compartment is hardly affected, which means that any goods can be accommodated therein.

Furthermore, in the lifted state of the mezzanine floor and bag, the standard load floor becomes available for positioning the packed goods thereon. Thus, the loads can be handled at a normal height, which is of importance while moving the loads by means of e.g. a forklift truck. Moreover, moving the loads within the load compartment itself is also possible as a result of the height available within the load compartment. The mezzanine floor with flexible bag can be installed in any standard transport vehicle, such as a trailer. Additionally, in the lifted position the vulnerable flexible bag is well protected against damage having regard to the fact that the packed goods are at a lower level.

The flexible bag may comprise a flexible material such as rubber or plastic. The bag is closed in itself, and may be provided with a fluid valve for filling and emptying the bag. Preferably, the fluid valve is at the back of the bag near the load door(s). This contributes to the ease of filling and emptying the bag. The mezzanine floor is preferably provided with a recess in which the valve is accommodated. When lifting the mezzanine floor up to and against the roof of the load compartment, the valve, which may be rather bulky, will not hamper the upward movement of the mezzanine floor as it will be accommodated within said recess of the mezzanine floor. In the case of a trailer, the bag has an elongate shape which largely conforms the shape of the load floor of the trailer.

With the aim of stabilizing the filled bag, the mezzanine floor may comprise upstanding longitudinal side edges. Also, these upstanding edges will protect the bag with respect to contact with the longitudinal side walls of the load compartment, thus preventing frictional wear of the bag. Also, tie wraps may be provided which extend over the bag and the ends of which are connected to opposite longitudinal sides of the mezzanine floor.

The means for lifting and lowering the mezzanine floor and bag should preferable occupy as little space as possible, so as to guarantee a maximum load capacity of the load compartment. To that end, the lifting means preferably comprise flexible pulling members, such as straps, one end of which is connected to the mezzanine floor and the other end of which is wound on a respective winch element. Several of these pulling members, together with corresponding winch elements, are distributed at regular intervals along the longitudinal side walls, so as to provide for a reliable handling of the mezzanine floor. Preferable, the winch elements are located as close to the roof of the load compartment as possible in order to reach the maximum lifting height of the mezzanine floor and thereby the maximum height between the load floor and the lifted mezzanine floor.

The winch elements can be operated in a uniform way, for instance by interconnecting these through a torsion rod. The torsion rod may be driven in rotation through any suitable drive source, such as an electric motor or a hydraulic motor. Preference is given to a hydraulic motor, as the torsion rods, and thus the mezzanine floor, can then be simply immobilized by closing the hydraulic circuit.

The torsion rods at both longitudinal side walls of the load compartment may be interconnected in order to obtain a uniform movement of the mezzanine floor. To that end, each torsion rod may engage a transversely extending drive rod through a tooth wheel transmission, said drive rod being connected to a hydraulic or electric motor. However, other interconnection means may be provided as well, such as electric interconnections.

After the mezzanine floor and the flexible bag have been lifted, they may be locked in that position by separate locking means. In this connection, the side walls may comprise upwardly extending mounting rails. By means of a support bar, can be connected to pairs of opposite mounting rails, the mezzanine floor can be supported.

As mentioned before, the valve is preferable positioned at the back of the bag, near the load compartment doors. Emptying of the bag is obtained by opening the valve, which makes the liquid simply flow out of the bag under the influence of gravity. However, in the case of a fairly long bag, as may occur in long trailers, some of the liquid tends to remain within the bag as the valve is simply too far away. Still, the bag can be emptied fully by applying a method which comprises the steps of:
- operating the lifting means while the bag is filled with said fluid,
- during said operation of the lifting means, making the mezzanine floor tilt towards the fluid valve,
- opening the fluid valve and making the fluid flow towards said valve under the influence of the tilted position of the bag.

The tilting motion of the mezzanine floor can be obtained in various ways, for instance by individually driving the winch elements. However, preference is given to a fairly simple approach, which comprises the steps of:
- providing, on each longitudinal side wall, a pulling member relatively close to the front wall which is shorter than a pulling member further away from said front wall,
- making the mezzanine floor tilt as a result of the length differences of said pulling members.

Reference is furthermore made to the state of the art as disclosed in FR-A-900.012, related to a vehicle with a load compartment provided with a mezzanine floor which is sealed with respect to the top region of the load compartment by means of membranes. The space defined above the mezzanine floor and between the membranes may receive a liquid. The disadvantage of said prior art proposal is that the membranes do not provide a completely closed bag for the liquid, which will lead to problems such as spilling over of the liquid, in particular when negotiating bends with the transport vehicle. Furthermore, it is not possible to install the liquid compartment in a simple manner, as the membranes will have to be connected to the side walls of the load compartment.

WO-00/03893 discloses a bulk goods transport vehicle with an open topped body. A bladder, which is connected to the open top, can be deployed downwardly into the body so as to avoid cross-contamination. The load compartment of said prior art transport vehicle does not have load doors at the back, and is therefore not fit for transporting packed goods such as parcels.

BRIEF DESCRIPTION OF THE DRAWING FIGURES

The invention will now be described further with reference to the embodiment shown in the drawings.

FIG. 7 shows the view of the flexible bag filled with a liquid.

DESCRIPTION OF THE PREFFERED EMBODIMENTS

Figure 1:
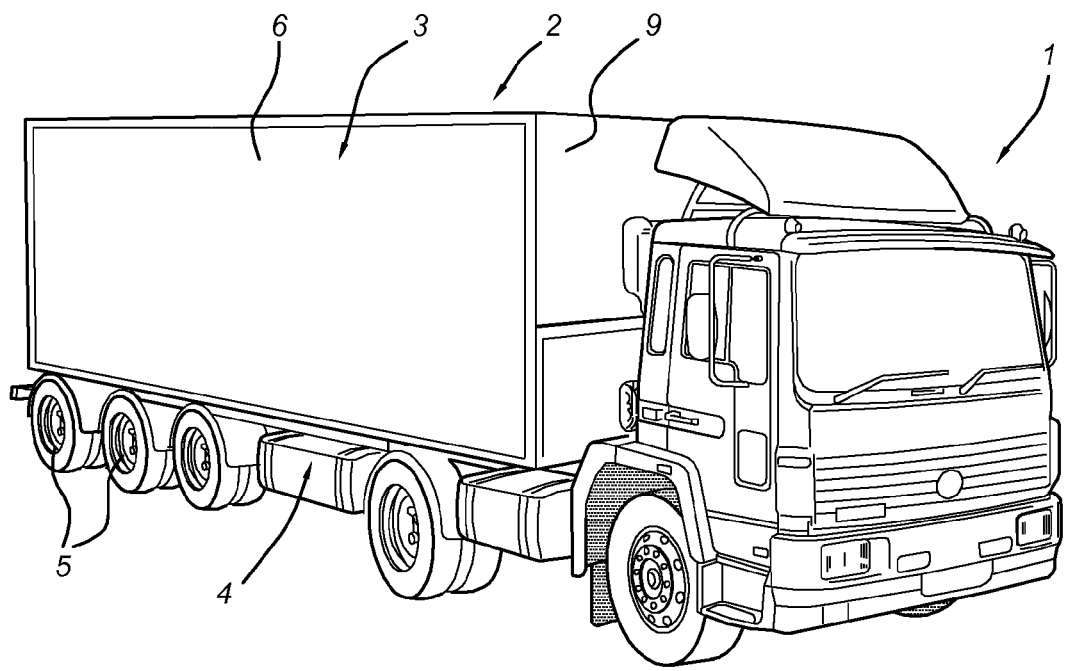
FIG. 1 shows the a truck with trailer according to the invention.

FIG. 1 shows an example of a transport vehicle which has been equipped with a mezzanine floor and flexible bag according to the invention. Said transport vehicle consists of a truck 1 and trailer 2. Said trailer 2 consists of the load compartment 3 and the chassis 4 which is provided with wheels 5. Furthermore, the truck 1 and the trailer 2 are connected to each other in a traditional way by means of well-known coupling means (not shown) which allow relative rotations.

Figure 2:
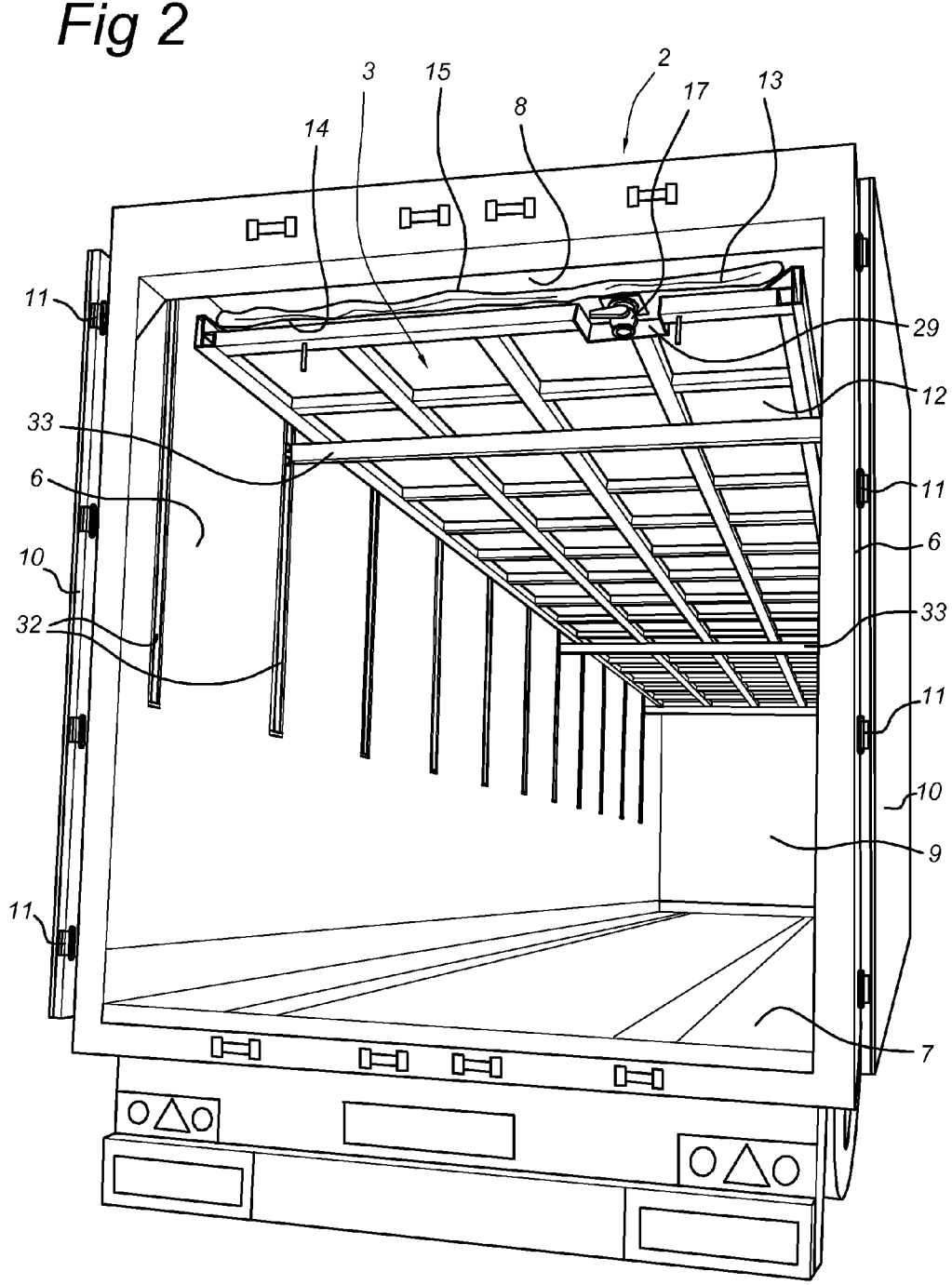
FIG. 2 shows a view from the back of the trailer with open back doors while the mezzanine floor is in the uppermost position.

As furthermore shown in FIG. 2, the load compartment 3 consists of the longitudinal side walls 6, the load floor 7, the roof 8, the front bulkhead 9 and the back doors 10 which have been swung about the hinges 11 into in the fully open position in FIG. 2, against the outside of the longitudinal side walls 6. A heating device 35 has been mounted on the outside of the front bulkhead, for heating the load compartment 3 as will be explained hereunder.

Within the load compartment 3, the mezzanine floor 12 has been provided. Said mezzanine floor supports the closed flexible bag 13. In particular, the lower surface 14 of said flexible bag 13 rests on top of the mezzanine floor of 12. The upper surface 15 of said flexible bag 13 is freely supported above the lower surface 14. In the situation shown in FIGS. 2-4 and 6, the flexible bag 13 is empty which means that the upper surface 15 rests on the lower surface 14. However, in the position as shown in FIG. 7, the flexible bag 13 has been filled with a liquid through hose 16 connected to the valve 17 of the flexible bag 13. In this position, the upper surface 15 is supported at a distance above the lower surface 14, in dependence on the amount of liquid which has been introduced into the bag 13. A vent 34 has been provided for releasing gases from the flexible back 13 during the process of filling thereof.

Figure 3:
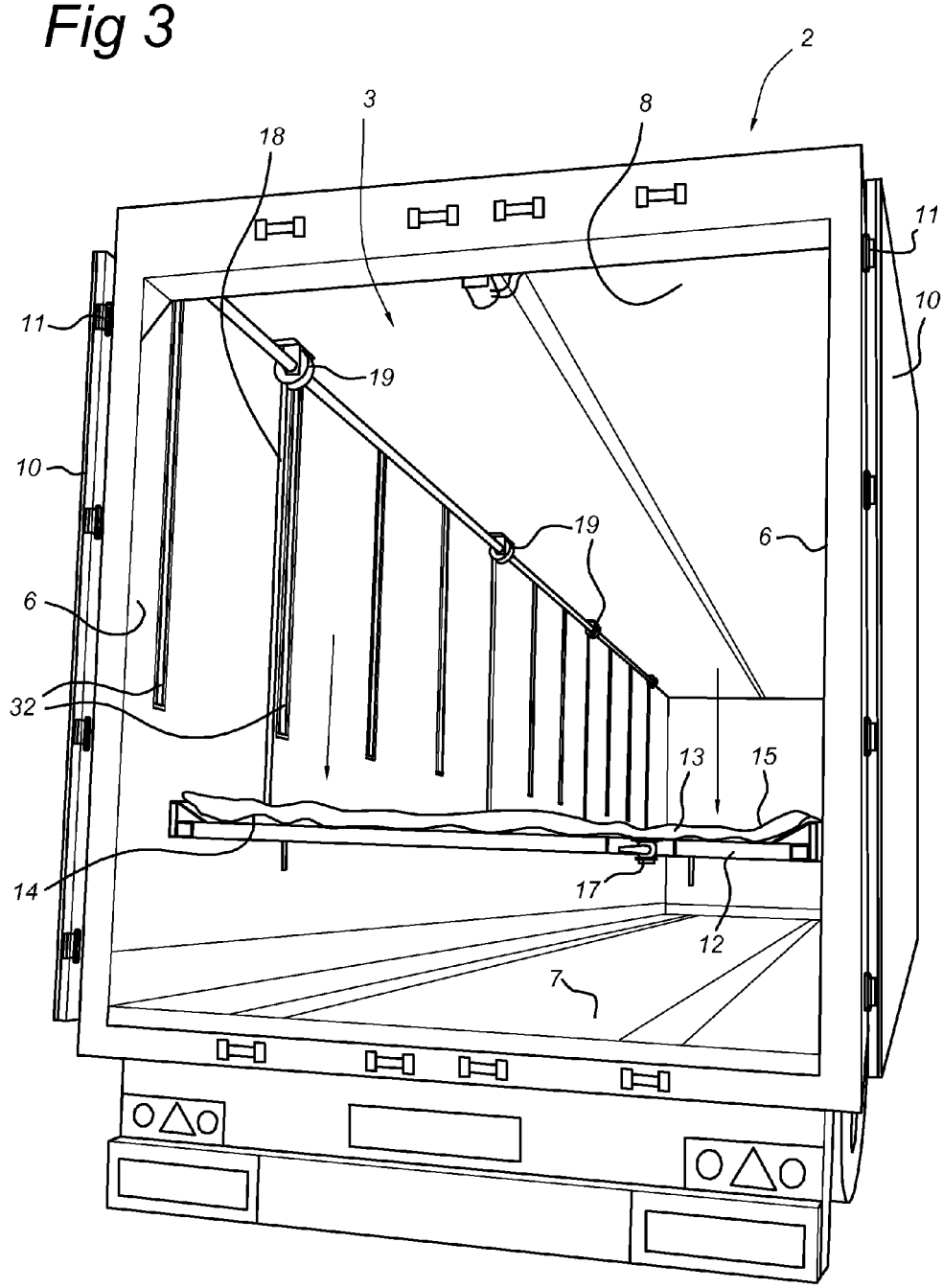
FIG. 3 shows a view similar to FIG. 2, with the mezzanine floor in an intermediate position.
Figure 4:
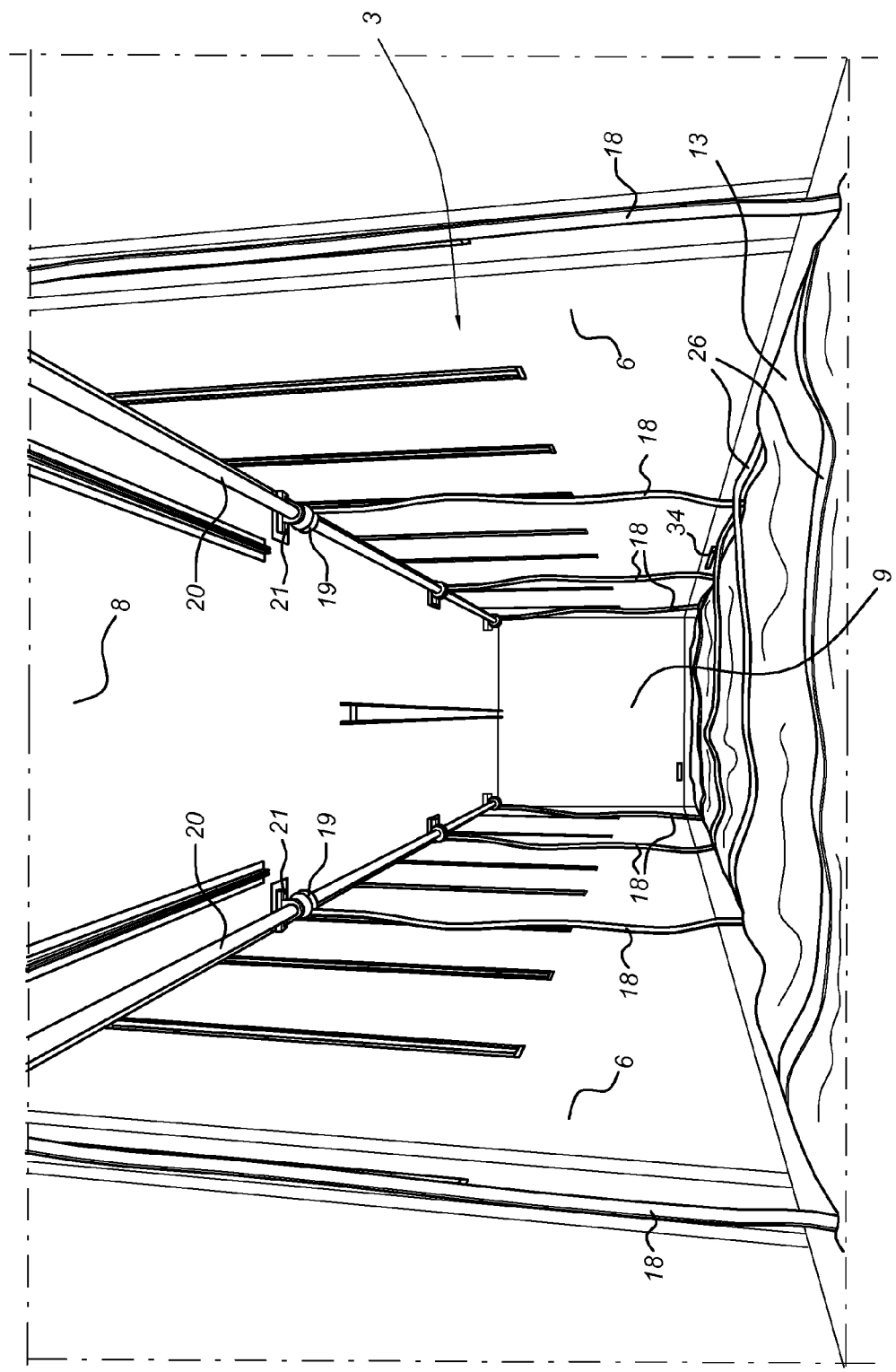
FIG. 4 shows the mezzanine floor in the fully lowered position.

Now turning to the FIGS. 3 and 4, the mezzanine floor 12 is supported from the roof 8 by means of the flexible straps 18 which are each wound on a winch element 19. As can be seen in FIG. 3, in this embodiment four of these winch elements 19 and four straps have been provided along each longitudinal side wall 6 of the load compartment 3. Of course, depending on the length of the load compartment and the weight to be supported, more or less of these winch elements and straps can be applied. The winch elements 19 each fixed on one of the torsion rods 20 which run next to the longitudinal side walls 6, and which are rotatably supported with respect to the roof 8 by means of bearing blocks 21.

The roof has been provided with a heat distributing duct 36. Said duct is fed with heated air form the heating device 35 which is mounted on the outside of the front bulkhead 9, as mentioned before. Thus, the load compartment 3 can be heated as desired. The heat distributing duct 36 is of a limited height, in such a way that it does not interfere with the upward movement of the mezzanine floor 12.

Figure 5:
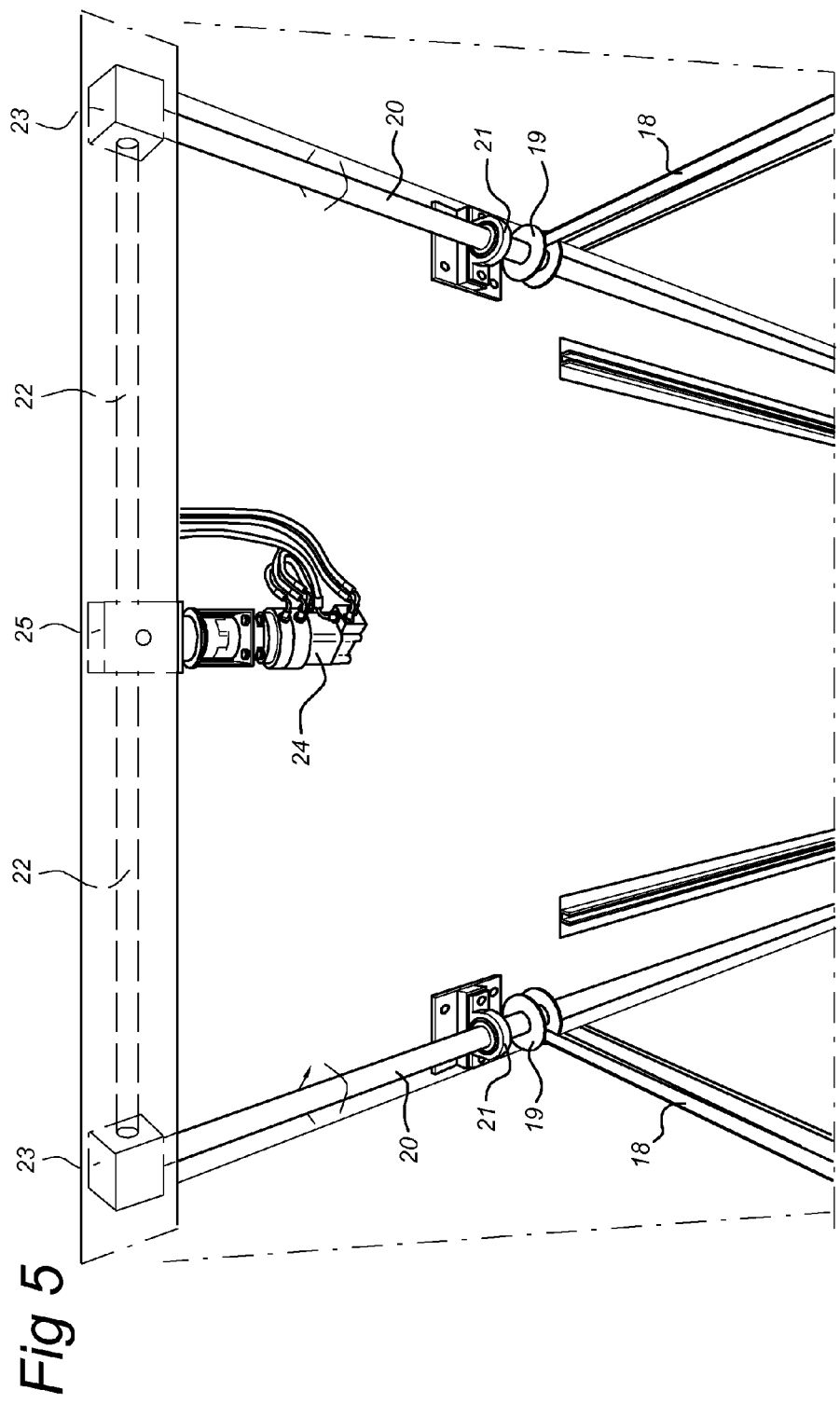
FIG. 5 shows a view of the ceiling of the load compartment of the trailer, with a hydraulic drive.
Figure 6:
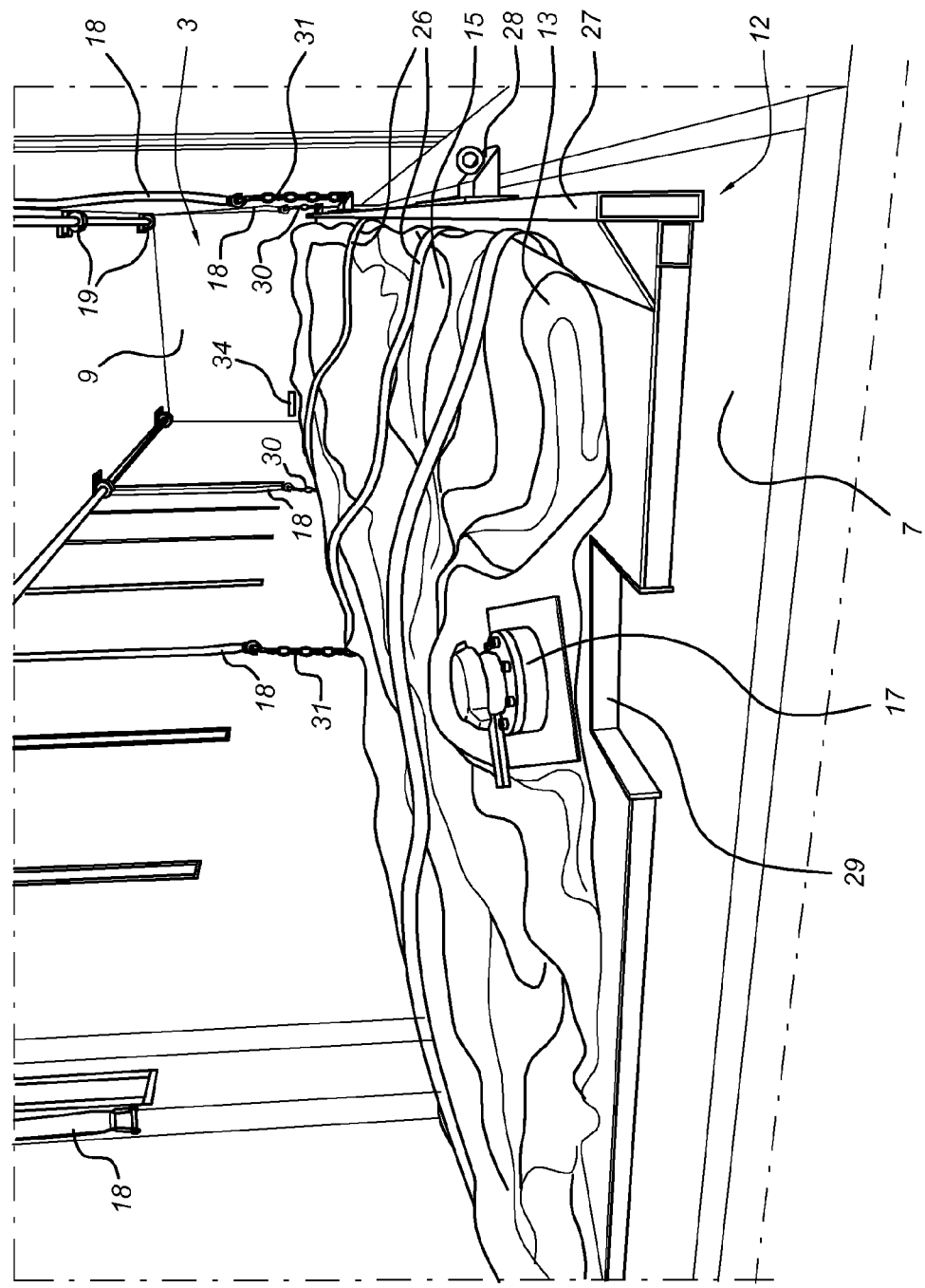
FIG. 6 shows a view of the mezzanine floor in the tilted position.

As shown in FIG. 5, the torsion rods 20 are interconnected through the transversely extending drive rod 22 and the gear transmissions 23. The drive rod 22 itself is driven by the hydraulic motor 24 through the gear transmission 25. By energizing the hydraulic motor 24, the mezzanine floor 12 together with the flexible bag 13 can be moved up and down, as desired. By closing the hydraulic lines which feed the hydraulic motor 24, the mezzanine floor 12 can be locked in any desired position.

As also shown in FIG. 4, tie wraps 26 extend over the flexible bag 13. These tie wraps 26 are each connected to opposite edges of the mezzanine floor 12, so as to stabilize the filled flexible bag 13 as shown in FIG. 7. By tensioning the tie wraps 26, the flexible black 13 can be held reliably with respect to the mezzanine floor 12. As furthermore shown in FIG. 6, the mezzanine floor 12 has longitudinal upstanding edges 27 which furthermore have a stabilizing effect on the flexible bag 13. Onto the upstanding edges 27, brackets 28 have been welded onto which the straps 19 are connected. As also clearly visible in FIG. 6, the mezzanine floor 12 comprises a recess 29 for accommodating the valve 17, in particular in the raised position thereof as shown in FIG. 2.

For the purposes of completely emptying the flexible bag 13 through the valve 17, it is desirable to tilt the mezzanine floor 12 in such a way that the back of the mezzanine floor 12 is at a lower level than the front thereof. Such tilting position can be obtained by providing extension pieces in the form of chains 30, 31. In this connection, the straps which are closest to the front wall 9 of the load compartment 3 are directly connected to the corresponding brackets 28. Seen from the front wall 9, the second straps 19 are provided with a relatively short chain 30, and the third straps 19 are provided with a somewhat longer chain 31. Through these chains 30, 31, the second and third straps 19 are connected to the corresponding brackets 28. The fourth straps remain loose. By now energizing the hydraulic motor 24, the front part of the mezzanine floor 12 is lifted over a greater distance than the back part of the mezzanine floor 12, thus promoting the flow of liquid within the flexible back 13 towards and through the valve 17.

As shown in FIGS. 3 and 4, the longitudinal side walls 6 are provided with mounting rails 32. Between two opposite mounting rails 32, a support bar 33 can be applied as shown in FIG. 2. By means of these support bars 32, the mezzanine floor 12 can be secured in a desired location. Although in FIG. 2 the mezzanine floor 12 has been secured in the uppermost position, it is also possible to apply the support bars 33 at a lower position, for providing additional loading space on top of the mezzanine floor after removing the flexible bag.

LIST OF REFERENCE NUMERALS

1. Truck
2. Trailer
3. Load compartment
4. Chassis
5. Wheels
6. Longitudinal side wall
7. Load floor
8. Roof
9. Front wall
10. Backdoor
11. Hinge
12. Mezzanine floor
13. Flexible bag
14. Bottom wall flexible bag
15. Top wall flexible bag
16. Hose
17. Valve
18. Strap
19. Winch
20. Torsion rod
21. Bearing block
22. Drive rod
23. Gear transmission
24. Hydraulic motor
25. Gear transmission
26. Tie wrap
27. Upstanding edge mezzanine floor
28. Bracket
29. Recess mezzanine floor
30. Relatively short chain
31. Relatively long chain
32. Mounting rail
33. Support bar
34. Vent
35. Heating device
36. Heat distributing duct

The invention claimed is:

1. Transport vehicle, comprising:
   a chassis (4) provided with wheels (5), a load compartment (3) on said chassis (4) and provided with a load floor (7), longitudinal side walls (6) which extend upwardly with respect to the load floor, a bulkhead at the front and defining a front wall (9), at least one load door (10) at the back, as well as a roof (8), wherein a mezzanine floor (12) is provided in the load compartment (3) above the load floor (7), lifting means (18-25) which cooperate with the mezzanine floor (12) to adjust the height of said mezzanine floor with respect to the load floor, as well as a closed flexible bag (13) for containing a fluid, said bag having a lower surface (14) and an upper surface (15), said lower surface (14) of the bag (13) being supported in the load compartment (3) and said upper surface (15) of the bag being freely supported above said lower surface (14) in dependence on the contents of the bag (13), characterized in that the flexible bag (13) is positioned on top of the mezzanine floor (12), wherein the bag (13) is provided with a fluid valve (17) for filling and emptying the bag, and wherein the mezzanine floor (12) is provided with a recess (29) in which the valve (17) is accommodated.

2. Vehicle according to claim 1, wherein the bag (13) comprises a flexible material.

3. Vehicle according to claim 1, wherein the fluid valve (17) is at the back of the bag near the load door (10).

4. Vehicle according to claim 1, wherein the bag (13) has a vent (34) for venting air or gas which is contained in the bag.

5. Vehicle according to claim 1, wherein the mezzanine floor (12) comprises upstanding longitudinal side edges (27).

6. Vehicle according to claim 1, wherein tie wraps (26) are provided which extend over the bag (13) and the ends of which are connected to opposite longitudinal sides of the mezzanine floor (12).

7. Vehicle according to claim 1, wherein the lifting means comprise flexible pulling members, one end of which is connected to the mezzanine floor (12) and the other end of which is wound on a respective winch element (18).

8. Vehicle according to claim 7, further comprising at least two winch elements (18) distributed along each of longitudinal side walls (6) and near the roof (8), each of the at least two winch elements being connected to a respective pulling member.

9. Vehicle according to claim 8, wherein the winch elements (18) are interconnected through a torsion rod (20), each torsion rod being driven by a hydraulic drive (24).

10. Vehicle according to claim 9, wherein each torsion rod (20) engages a transversely extending drive rod (22) through a transmission (23), said drive rod being connected to a motor (24).

11. Vehicle according to claim 1, wherein the longitudinal side walls (6) comprise upwardly extending opposite mounting rails (32), a support bar (33) being provided which is connectable to pairs of opposite mounting rails, the mezzanine floor (12) being supportable by said supporting bars (33) connected to a pair of opposite mounting rails (32) each.

12. Vehicle according to claim 1, wherein the bag (13) comprises rubber.

13. Vehicle according to claim 1, wherein the bag (13) comprises plastic.

14. Vehicle according to claim 1, wherein the lifting means comprise flexible pulling members, in the form of straps (19), one end of which is connected to the mezzanine floor (12) and the other end of which is wound on a respective winch element (18).

15. Vehicle according to claim 14, wherein at least two winch elements (18) are distributed along the each longitudinal side wall (6) and near the roof (8), each winch element being connected to a respective strap (19).

16. Method for operating a vehicle comprising a chassis (4) provided with wheels (5), a load compartment (3) on said chassis (4) and provided with a load floor (7), longitudinal side walls (6) which extend upwardly with respect to the load floor, a bulkhead (9) at the front and defining a front wall (9), at least one load door (10) at the back, as well as a roof (8), wherein a mezzanine floor (12) is provided in the load compartment (3) above the load floor (7), lifting means (18-25) which cooperate with the mezzanine floor (12) to adjust the height of said mezzanine floor with respect to the load floor, as well as a closed flexible bag (13) for containing a fluid, said bag having a lower surface (14) and an upper surface (15), said lower surface (14) of the bag (13) being supported in the load compartment (3) and said upper surface (15) of the bag being freely supported above said lower surface (14) in dependence on the contents of the bag (13), characterized in that the flexible bag (13) is positioned on top of the mezzanine floor (12), wherein the bag (13) is provided with a fluid valve (17) for filling and emptying the bag, and, wherein the fluid valve (17) is at the back of the bag near the load door (10), said method comprising the steps of:

filling the flexible bag (13) with a fluid, operating the lifting means (18-25) while the flexible bag (13) is filled with said fluid, during said operation of the lifting means (18-25), making the mezzanine floor (12) tilt, and opening the fluid valve (17) and making the fluid flow towards said valve under the influence of the tilted position of the flexible bag (13).

17. Method for operating a vehicle comprising a chassis (4) provided with wheels (5), a load compartment (3) on said chassis (4) and provided with a load floor (7), longitudinal side walls (6) which extend upwardly with respect to the load floor, a bulkhead (9) at the front and defining a front wall (9), at least one load door (10) at the back, as well as a roof (8), wherein a mezzanine floor (12) is provided in the load compartment (3) above the load floor (7), lifting means (18-25) which cooperate with the mezzanine floor (12) to adjust the height of said mezzanine floor with respect to the load floor, as well as a closed flexible bag (13) for containing a fluid, said bag having a lower surface (14) and an upper surface (15), said lower surface (14) of the bag (13) being supported in the load compartment (3) and said upper surface (15) of the bag being freely supported above said lower surface (14) in dependence on the contents of the bag (13), characterized in that the flexible bag (13) is positioned on top of the mezzanine floor (12), wherein the bag (13) is provided with a fluid valve (17) for filling and emptying the bag, and, wherein the fluid valve (17) is at the back of the bag near the load door (10), said method comprising the steps of:

providing, on each longitudinal side wall (6), a pulling member (19, 30) relatively close to the front wall (9) which is shorter than a pulling member (19, 31) further away from said front wall, and making the mezzanine floor (12) tilt as a result of the length differences of said pulling members.

\* \* \* \* \*